(12) United States Patent
Tomasso

(10) Patent No.: US 6,607,774 B1
(45) Date of Patent: Aug. 19, 2003

(54) SELF-SEALING EXPANDED EDIBLE PRODUCT

(75) Inventor: Jennifer Tomasso, Morris Plains, NJ (US)

(73) Assignee: Mars, Incorporated, McLean, VA (US)

( * ) Notice: Subject to any disclaimer, the term of this patent is extended or adjusted under 35 U.S.C. 154(b) by 345 days.

(21) Appl. No.: 09/709,360

(22) Filed: Nov. 13, 2000

(51) Int. Cl.$^7$ ................................................. A23G 3/00
(52) U.S. Cl. ....................... 426/564; 426/576; 426/577; 426/578; 426/660; 426/440; 426/445
(58) Field of Search ................. 426/660, 576, 426/577, 578, 564, 440, 445

(56) References Cited

U.S. PATENT DOCUMENTS

| | | | |
|---|---|---|---|
| 3,711,300 A | 1/1973 | Forkner | 426/94 |
| 3,782,966 A | 1/1974 | Forkner | 426/94 |
| 4,104,408 A | 8/1978 | Chiu | 426/94 |
| 4,415,595 A | 11/1983 | Takemori et al. | 426/101 |
| 4,491,596 A | * 1/1985 | Elias | 426/5 |
| 5,340,598 A | * 8/1994 | Hay et al. | 426/496 |
| 5,942,273 A | 8/1999 | Mochizuki et al. | 426/549 |
| 6,207,207 B1 | * 3/2001 | Belzowski et al. | 426/303 |
| 6,419,965 B1 | * 7/2002 | Douaire et al. | 426/19 |

FOREIGN PATENT DOCUMENTS

JP         363024854 A   *  2/1988

* cited by examiner

Primary Examiner—Nina Bhat
(74) Attorney, Agent, or Firm—Fitzpatrick, Cella, Harper & Scinto

(57) ABSTRACT

Expanded edible products having a porous, foamed, or cellular interior and self-sealing surface or skin are provided. The texture and structure of the expanded products are controlled by manipulating a pre-expanded food formulation comprising hydrocolloid and moisture.

30 Claims, 2 Drawing Sheets

SELF-SEALING EXPANDED EDIBLE PRODUCT

BACKGROUND OF THE INVENTION

1. Field of the Invention

The present invention is directed to the field of expanded edible products having a porous, foamed, or cellular interior and, most significantly, a self-sealing surface or skin.

2. Description of the Related Art

Expanded food products, broadly understood, means food products that have air pockets. Such products are particularly popular in the confectionery field. Many such expanded food products and methods of making them are known in the art and are commercially available.

One method of forming an expanded product is known as chemical aeration. This method may use, for example, bicarbonate of soda to cause a chemical reaction forming gas that creates pockets as it escapes from the interior of the recipe. The resulting center material has a cellular matrix. The familiar "rising" of bread is another example. In this case, a chemical reaction involving yeast results in the formation of a porous cellular structure. In many instances, it is desirable to avoid a chemical aeration process in the manufacture of an expanded food product, either to avoid the use of the additional recipe components, or to avoid the by-products that are left behind.

A technique for avoiding chemical aeration has been the use of vacuum oven technology to prepare expanded food products by vaporization of moisture in the pre-expanded mix.

It has been observed that the cellular structure of expanded products extends to the surface of the products, so that holes appear in the surface of the article. The result is that these expanded products tend to have a more fragile surface. When these products are jostled together, such as in a package or during manufacture, tiny particles are broken off as dust. This problem, referred to herein as "dusting," has limited the development of a full range of expanded food products.

Potential solutions to the problem of dusting typically include coating the formed expanded food product to obtain a surface having structural integrity. However, it is often difficult to coat or perform other process steps on an expanded product because of the fragile surface. Thus, an expanded product with a self-sealing surface that is resistant to abrasion and which does not crumble during packaging and shipment represents a solution to a long-felt need in the industry. Such an expanded food product having a substantially self-sealing, structurally stable surface would avoid the problem of dusting without the necessity of performing additional steps.

U.S. Pat. No. 4,104,405 discloses that expanded confectionery, such as marshmallow, may be prepared using a formulation mix containing a film forming agent and beating air into the mix with a whipping operation. Expanded confectionery, however, prepared by vaporization of moisture and having a self-sealing surface or skin are not disclosed or suggested.

It would be highly desirable to provide an expanded food product, having low caloric density and a light aerated texture, prepared without using chemical aeration or requiring pre-whipping, and having a structurally stable surface achieved without coating or treatment.

SUMMARY OF THE INVENTION

This invention is directed to expanded food products prepared by expanding food formulations comprising a structure-enhancing hydrocolloid, water and a bulking agent. At least one component of the food formulation is crystallizable. The expanded products comprise a cellular inner portion containing pores formed by vaporization of at least a portion of the water and a substantially self-sealing surface portion having a greater density than the inner portion. The inner portion has a "center density" and the self-sealing surface portion has a "surface density," and the ratio of the center density to the surface density ranges between about 1:1.25 to about 1:2.5.

Self-sealing expanded edible products according to the invention can have a crispy, aerated structure which dissolves rapidly to release an intense flavor, while at the same time exhibiting an increased resistance to abrasion. Aeration may be achieved without chemical byproducts, such as sodium, which is tremendously important for those people on a low-sodium diet and is also important to avoid the excessively salty taste associated with such byproducts.

This invention is also directed to a method of preparing the above-described self-sealing expanded edible products.

DETAILED DESCRIPTION OF THE PREFERRED EMBODIMENTS

Figure 1:
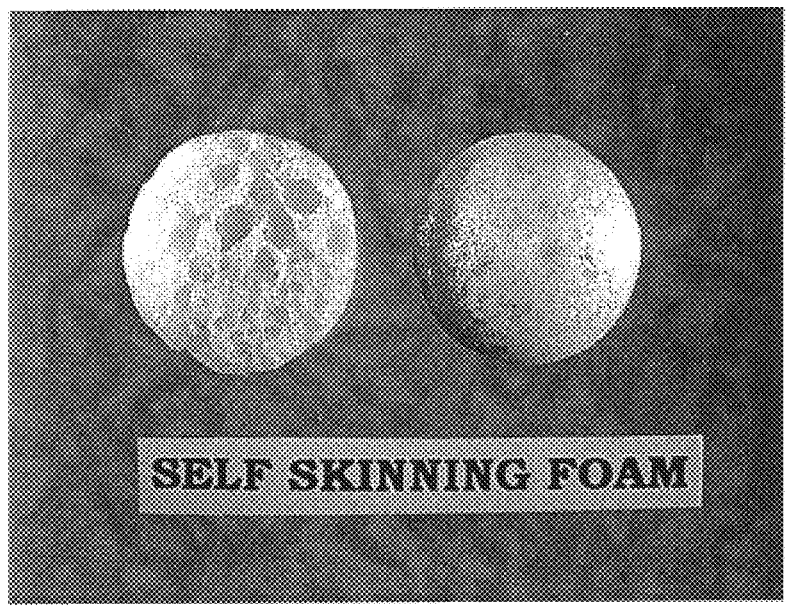
FIG. 1 is a photograph showing self-sealing expanded products according to the invention. The product on the left is shown with the surface removed. The product on the right shows the self-sealing surface.
Figure 2:
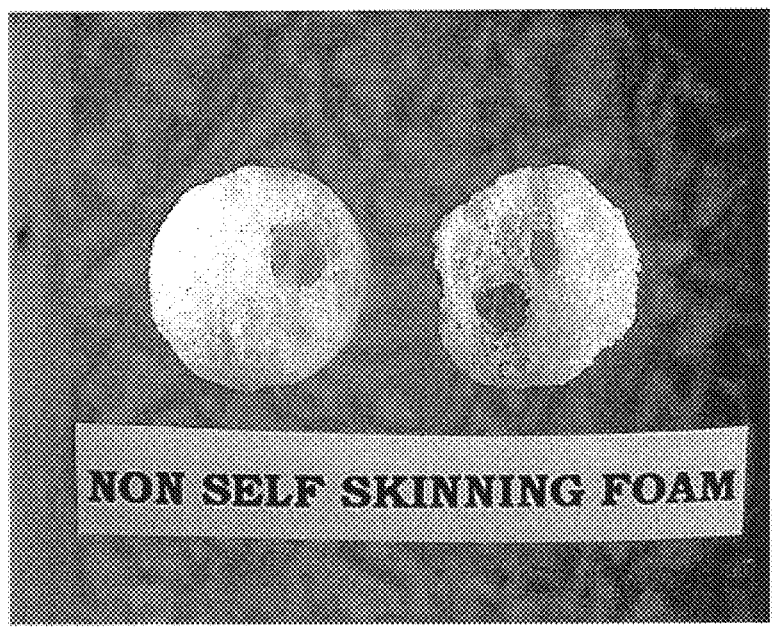
FIG. 2 is a photograph showing a prior art toffee recipe that has been vacuum-expanded. The surface is not self-sealing and has holes.

An important characteristic of the expanded products described and claimed herein is that they are self-sealing, sometimes referred to as self-skinning. Self-sealing or self-skinning means that a surface having substantially greater density and substantially less porosity than the interior of the expanded product forms without the application of a coating or separate treatment to alter the surface characteristics of the product. Of course, a coating may still be applied to, or a surface-structure-enhancing treatment performed upon, a self-sealed product without departing from the scope of the invention.

Density, as used herein (unless expressly stated otherwise), refers to absolute density. Absolute density should be carefully distinguished from bulk density, which refers to the weight of expanded products per unit volume. Absolute density is generally determined with the aid of a liquid whose density is known (water or ethanol are usually used as auxiliary liquids). The solid sample is weighed in air (A) and then in the auxiliary liquid (B). The density Q can be calculated from the two weighings as follows:

$$Q = \frac{A}{A-B} \cdot Q_o$$

where Q is the density of the solid, A is the weight of the solid in air, B is the weight of the solid in the auxiliary liquid and $Q_0$ is the density of the auxiliary liquid at the given temperature.

Surface density means the absolute density of the surface of the expanded food product. To obtain surface densities, a surface portion of the product is removed from the product to a depth where the surface begins to form. This is a point where the pore size begins to change rapidly, relative to the variation in either the center portion or the surface portion. Center density means the absolute density of the expanded food product with the surface of the product removed. Total piece density refers to the absolute density of the expanded food product, surface and center portions included.

The total piece density of the expanded products according to the invention is an important characteristic. If the density is too low, the product will not have structural integrity. If the density is too high, the product will not have the texture or appearance of an expanded product. A preferred total density ranges between about 0.15 g/cm$^3$ to about 0.5 g/cm$^3$, and between 0.15 g/cm$^3$ to about 0.30 g/cm$^3$ is preferred, with total densities in the neighborhood of about 0.20 g/cm$^3$ being most preferred.

Significantly, the expanded food product of this invention is formed, i.e., aeration is achieved, by vaporization of at least a portion of the available water in the pre-expanded food formulation. At least a portion, and preferably substantially all of the aeration achieved in the expanded food product of this invention is obtained by vaporization of available water. Other means of aeration, e.g., chemical, may be used in combination with water vaporization, if desired.

Careful distinction must be made between available water and total moisture. Total moisture, as used herein, includes available water and bound water, while available water includes water that vaporizes to form pores, and water that migrates throughout the product, but does not include bound water. Water activity ("Aw") is an art recognized term defined, for example, in Food Chemistry, 2d Ed., edited by R. Owen and published by Marcel Dekker, Inc., New York (1985), herein incorporated by reference. Water activity is a measure of the amount of total moisture that is available water.

The expanded food product of this invention having the self-sealing characteristic described must contain a hydrocolloid and water. However, sugars, fats, proteins and other additives may all be used in preferred embodiments according to the invention and play an important role in the structure, texture, mouthfeel, taste and appearance of the expanded products.

Structure-enhancing hydrocolloid (sometimes referred to herein simply as "hydrocolloid") is a critical component of the expanded products according to the invention. Structure-enhancing hydrocolloid, as used herein, means any substance that undergoes gelation upon absorbing water. The hydrocolloids used with the present invention are not particularly limited, except of course that they must be compatible with an edible product. Exemplary hydrocolloids include, without limitation, amylose or amylopectin starches, gelatins, dextrins, pectins, gum arabic, alginates, carageenan gum, agar, locust bean gum, guar gum, xanthan gum, gellan gum, and mixtures thereof. In a preferred embodiment, the hydrocolloid comprises a mixture of starch, gelatin, and dextrin in a cumulative amount of a little less than 1.0 weight percent with respect to the product after expansion.

The underlying function of the hydrocolloid in the expanded products according to the invention is that it provides structure to the expanded product. A highly expanded structure will not have sufficient rigidity or stability at a given pore size unless a hydrocolloid is used. However, above a certain amount, hydrocolloid will not serve any further structure-enhancing effect (i.e., the size of pores obtainable in the expanded product will not have enough structure to hold pores created by vaporized water by the addition of further hydrocolloid). In these instances, where excess hydrocolloid is used, the further hydrocolloid acts as a bulking agent in the matrix.

One of ordinary skill in the art will readily understand that the ability of a hydrocolloid to impart structural stability depends not only on the amount used, but on the type of hydrocolloid used.

By way of example, and not intending to limit the scope of the invention, if gelatin is used, between about 0.1 and about 4 weight percent, and preferably between about 0.25 to about 2.5 weight percent of the pre-expanded food formulation is sufficient to obtain a structure-enhancing effect. In the preferred mixture of dextrin, gelatin and starch, a total amount of hydrocolloid in the range of 0.5 to about 5 weight percent of the pre-expanded food formulation is used. If certain specialty edible suspending and gelling agents are used, it may be practical to provide an expanded product having less hydrocolloid. In preferred embodiments, the amount of starch providing a structure-enhancing effect is between about 0.5 and about 10 weight percent. However, this is understood to be highly dependent on the type of hydrocolloid used. The overall amount of hydrocolloid in the product, including hydrocolloid that may be used as a bulking agent in the matrix, ranges between about 0.25 weight percent and about 95 weight percent, preferably about 1 weight percent to about 60 weight percent.

Moisture is another critical component of the expanded products of the present invention. Vaporized water provides "lift" or volume to the expanded product.

During manufacture, vaporized moisture forms pores that create a cellular matrix characteristic of the expanded products. Where too much moisture is used, in excess of about 10 percent by weight in a non-sugar based system and in excess of about 5.7 percent by weight in a sugar based system, rupture of the product surface can occur. Where too little moisture is used, less than about 3 percent by weight, not enough lift or volume is obtained.

In preferred embodiments, the total moisture content of the pre-expanded food formulation according to the invention ranges between about 4.5 weight percent and above 5.7 weight percent. While not limiting, in preferred embodiments, after expansion the moisture content of the expanded food product ranges between about 1.5 and about 2.0 weight percent, more preferably between about 1.5 and 1.8 weight percent. Water activity (Aw) ranges between about 0.35 to about 0.65 weight percent of the pre-expanded food formulation, and in the range of about 0.2 to about 0.3 weight percent in the expanded product.

The overall moisture of the product also plays a role through its interaction with other components included in the product, particularly the sugars that may be used to seed the product, as discussed below.

At least one component of the pre-expanded food formulation must be crystallizable and preferably the expanded food product contains at least one component in the crystalline state. The at least one component that may be crystallizable is not limited, but includes sugars, sugar alcohols, cellulose and the like. It is noted that starch may be a source of crystallizable sugars.

In preferred embodiments, sugar is used as a seeding agent in combination with water and a hydrocolloid. "Seeding" refers to a technique of shortening the product. In seeding, hygroscopic sugar particles bring about the migration of moisture through the product, which generally increases flexibility throughout the matrix and increases the ability of the product to be expanded.

Without being bound to theory, it is believed that the seed in the pre-expanded food formulation enhances the crystallization and deposition of the sugar primarily at the exterior of the expanded food product during vaporization of the moisture to provide a surface portion having a greater density than the inner portion of the expanded food product. It should be noted that the seed does not necessarily have to be added to the pre-expanded formulation but can be formed, in situ, if desired, by introducing shear to the pre-expanded formulation. In any event, vaporization of the available water is believed to induce crystallization of the sugar more predominantly at the surface portion of the expanded food product and this phenomenon is enhanced by the presence of a seed.

The degree of seeding crystal formation is influenced by moisture content and other factors such as, for example, sucrose-to-glucose ratio, while the type of crystal formed impacts the mouthfeel and the texture of the expanded product. For example, a multitude of fine crystals gives a melting impression, while a smaller number of large crystals gives a sandy, gritty, expanded texture.

Seeding crystal formation is affected by many factors, and may be controlled by altering the amount of sugar particles used, controlling the particle size of the sugar, and by mechanical working of a recipe. Thus, less sugar may be used with more mechanical work during mixing of the formulation prior to expansion to create a greater shortening effect for a smaller proportional amount of seeding sugar used. Similarly, reducing the particle size of sugar particles used, thereby increasing their surface area, will permit more shortening for a smaller proportional amount of sugar used.

Moisture enables the recipe to be seeded more easily by pulling or mechanical working. Thus, the amount of sugar seeding used may be lowered by increasing the amount of shear during mixing of the formulation prior to expansion if there is more moisture in the pre-expanded food formulation. The amount of sugar that may be used as a seeding agent is dependent, at least in part, upon the moisture content of the pre-expanded food formulation.

As a seeding agent, sugar is preferably used in an amount between about 1 weight percent and about 20 weight percent, preferably between about 5 weight percent and about 20 weight percent in the pre-expanded formulation. The preferred average particle size of the sugar used as a seeding agent ranges between about 5 microns and about 100 microns, preferably between about 50 microns and about 100 microns. Any sugar may be advantageously used, including glucose, dextrose, fructose, sucrose or mixtures thereof. In many embodiments, sucrose is preferred.

In preferred embodiments, in addition to the sugar used as a seeding agent, the expanded products utilize sugar as a matrix material to impart flavor and texture to the cellular matrix. Use of sugar as a matrix material is distinct from its use as a seeding agent. As a matrix component, sugars such as fructose, dextrose, sucrose, glucose, sugar alcohols, and mixtures thereof, may be used. In preferred embodiments, a combination of granular sucrose and corn syrup may be used. It is not necessary, or even preferable, that the sugar used as a bulking agent in the matrix be in particle form.

Typically, the overall amount of sugar in the expanded product, including sugar used as a seeding agent and sugar used as a matrix material, ranges between about 0 weight percent and about 95 weight percent, preferably between about 30 and about 85 weight percent.

Other seeding agents capable of crystallization may be used, besides sugars. It has been observed, for example, that cellulose included in a pre-expanded food formulation in amounts up to about 10 weight percent can result in a self-skinning product. Above about 10 weight percent, additional cellulose simply acts as a bulking agent.

Another component that may be included in embodiments of this invention is fat. Fat is used to provide a desirable mouthfeel to the expanded product. The fats used are not particularly limited, and may include any triglycerides typically used in food products, especially confectionery products. Fats useful in this invention include the naturally occurring fats and oils such as milk fat, anhydrous milk fat, fractionated milk fat, milk fat replacers, butterfat, and fractionated butterfat. Vegetable fats which may be employed include, for example, soybean oil, cotton seed oil, peanut oil, corn oil, olive oil, palm oil, palm kernel oil, coconut oil, cocoa butter and mixtures thereof. They may be fractionated or hydrogenated and include confectionery fats referred to and known in the art as Cocoa Butter Substitutes, Cocoa Butter Equivalents and Cocoa Butter Replacers. They may also include structured triacylglycerols that have been chemically or enzymatically derived. They may be refined as well as virgin fats and oils.

The amount of fat used in the composition, if fat is used at all, ranges between 0 and 12 weight percent in the pre-expanded formulation. At an upper limit of fat content, bubble formation in the cellular matrix is deleteriously suppressed. In preferred embodiments, extra hard general purpose fat is used in an amount ranging between 5 to about 10 weight percent, preferably between about 6 to about 7 weight percent, with respect to the pre-expanded formulation.

Proteins may also be used to provide a structure-enhancing effect and an acceptable mouthfeel to the expanded products according to the invention. Proteins may be used in place of fats to provide mouth feel. The type of protein used is not particularly limited and may include milk-based proteins, such as whey or milk protein concentrate, or caseinates. Alternatively, the protein may include soy, wheat, or egg proteins. In preferred embodiments, the protein is a milk-derived protein comprising between about 1 weight percent and about 30 weight percent of the expanded product.

The bulking agent used in the present invention provides bulk or fill for the expanded product. The edible material used as a bulking agent is not particularly limited. The bulking agent can include starches, sugars, cellulose, fibers or mixtures thereof. The bulking agent may comprise the same components that are identified above as being used in the composition as a seeding agent or as a structure-enhancing hydrocolloid. For example, the bulking agent may be an amount of hydrocolloid above that amount used to provide structure, or an amount of sugar above that amount used as a seeding agent.

The skin or surface portion of the self skinned product has a substantially higher density than the interior of the expanded product. While it is not always easy to determine at what depth the surface ends, such a determination may be made by visually observing the depth at which a substantial change in product density is detectable. The change in density will be observable by noting the change in pore size. Although surface depth may vary depending on the formulation of the expanded product, the density of the surface of a typical product to a depth of 0.75 mm from the surface may range between about 0.35 g/cm$^3$ to about 0.41 g/cm$^3$ while the density of the center of the product (i.e., that portion of the product below a depth of 0.75 mm from the surface) may range between about 0.2 g/cm$^3$ to about 0.25 g/cm$^3$. The difference in density between the surface and the center of the expanded products according to the invention may advantageously be expressed as a ratio. Preferably, the ratio of the center density to the surface density is in the range of about 1:1.5 to about 1:2.5, more preferably between about 1:1.45 to about 1:2.0, and most preferably between about 1:1.55 to about 1:1.75.

The surface of the self-sealed expanded product according to the invention is substantially less porous than the interior of the product. While the pores in the interior of the cellular matrix typically range between about 1.00 to about 4.25 mm in diameter, the pores on the surface are tiny, typically between about 0.15 mm to about 0.35 mm. This novel characteristic of the expanded products according to the invention may also be expressed in terms of a ratio. Preferably, the ratio of average pore diameters on the surface to average pore diameters in the interior of the product ranges between about 1:2.8 to about 1:16.0, preferably between about 1:4.0 to 1:9.5.

If the average pore size of the expanded product is relatively small, then the ratio of average pore diameters on the surface to average pore diameters in the interior of the product may vary within a narrower range. For example, if the average pore size in the interior of the product is in the neighborhood of 1.0 mm, the ratio in some embodiments may range between about 1:2.8 to about 1:5.0.

The structural stability or integrity at the surface of the expanded products of this invention is significantly improved compared to untreated prior art expanded products. This has profound impacts on the stability of the article during manufacture, packaging and shipping. One method of determining structural stability is to place products in close proximity to one another in bags placed in cartons in a simulated packaging environment. These cartons are then placed on a vibrating table and shaken for two hours. After two hours, the amount of tiny particles (dust) removed from the products is measured as a percentage of the total product weight, including remaining product and the dust. Broken pieces are not considered "dust." The results of this experiment and calculation is referred to herein as the "dust percentage." Preferably, the products prepared according to the invention have a dust percentage less than about 0.1 percent, more preferably less than 0.07 percent, even more preferably less than about 0.04 percent, and most preferably less than about 0.01 percent.

In particularly preferred embodiments, self-sealing products according to the invention have a cellular structure with greater integrity toward the surface of the product than in the interior. The integrity in the inner cellular portion may also increase gradually in the direction of the surface.

The size of the expanded product is not particularly limited. In preferred embodiments, samples of pre-expanded food formulation weighing about 0.8 grams to about 0.85 grams with dimensions of about 7.3 mm to about 11.5 mm prior to expansion yielded expanded pieces having diameters ranging between about 15 mm and about 16 mm. In addition, the shape of the expanded product is not particularly limited. In preferred embodiments the expanded product may take the form of spheres or bars.

In general, methods for making expanded products according to the invention comprise forming a pre-expanded food formulation comprising hydrocolloid, water and optionally, one or more of the other above-mentioned ingredients, and expanding the pre-expanded food formulation by vaporizing an effective amount of the water to form pores in the product, wherein the ratio of the center density to the surface density ranges from about 1:1.25 to about 1:2.5.

In a preferred embodiment, the step of forming a pre-expanded food formulation includes a step of making cooked syrup from sugar and water and cooking to a high solids content ranging from about 93 to about 97 percent solids. Matrix materials other than sugars and water could be used if a more savory product is desired. If the desired expanded product is a cereal-based product, the matrix material might have a high starch content, with relatively less sugar. The preferred expanded products disclosed herein are high sugar confectionery products and the raw syrup is cooked to a temperature between about 135° C. to about 145° C. depending on the solids content desired.

A preferred embodiment of the method of this invention further comprises mixing the cooked syrup with a jelly composition containing hydrocolloid, and additional water, and if desired additional sugar. The size and amount of sugar particles can be controlled at this stage within the limits described above to achieve the desired seeding crystal size.

While the formulation is being mixed, additional sugar, fat, protein, flavorings, colorings, or other additives may be added. The intensity of the work performed during mixing of the pre-expanded formulation may be adjusted as set forth above to control the structure and texture of the expanded food product.

To expand the formulation, the water is vaporized. Vaporization of water may be performed in a vacuum expansion oven or other device. If vacuum is used, water can be vaporized at a lower overall temperature.

The expanded products may be made by any known method of expansion, provided that at least some of the pores in the product are created by vaporization of available water. The preferred method is vacuum expansion in a vacuum expansion oven, as described in connection with the following Examples. However, other methods of expansion are possible including, without limitation, vacuum flash extrusion in which a pre-expanded formulation is injected through a nozzle into a vacuum chamber, where it is simultaneously cooled and dried to form an expanded product. Flash extrusion without the use of vacuum may possibly be used with the invention, provided the pre-expanded formulation can withstand the temperatures required to vaporize water at atmospheric pressure. It may also be advantageous to incorporate air into a product by injecting or by mechanical means such as a pin beater, and then perform additional expansion by vaporization of water to form a self-sealing expanded product.

The Examples which follow are intended as an illustration of certain preferred embodiments of the invention, and no limitation of the invention is implied.

EXAMPLES

Exemplary pre-expanded formulations were prepared according to the invention having the composition set forth in Table 1.

TABLE 1

|  | Recipe one batch g | Recipe two batch g | Recipe three batch g |
| --- | --- | --- | --- |
| RAW SYRUP |  |  |  |
| Granular sugar | 367 | 367 | 367 |
| Corn Syrup | 449 | 449 | 448 |
| Water | 184 | 184 | 184 |
|  | 1,000 | 1,000 | 1,000 |
| Cooked syrups | 95.25% solids | 95.0% solids | 94.75% solids |
| JELLY |  |  |  |
| Corn Syrup | 195 | 195 | 195 |
| Water | 417 | 417 | 417 |
| Sucrose | 149 | 149 | 149 |

TABLE 1-continued

|  | Recipe one batch g | Recipe two batch g | Recipe three batch g |
|---|---|---|---|
| Dextrin | 109 | 109 | 109 |
| Gelatin | 81 | 81 | 81 |
| Starch | 49 | 49 | 49 |
|  | 1,000 | 1,000 | 1,000 |
| Product composition |  |  |  |
| Cooked Syrup | 702 | 702 | 702 |
| Jelly | 39 | 39 | 39 |
| Icing Sugar | 195 | 195 | 195 |
| Fat | 63 | 63 | 63 |
|  | 1,000 | 1,000 | 1,000 |
| Moisture (wt %) | 5.1 | 5.3 | 5.5 |

The three recipes were the same except for the moisture content and the solids content of the cooked syrups.

In order to make products from recipe 1, the syrup ingredients were blended in a large pot and heated to 140° C. to 142° C. (A similar procedure was followed to make products from recipe 2 and recipe 3, except that the syrup ingredients were heated to a slightly lower temperature.) Meanwhile, the dry jelly components and the fat were separately weighed out. Corn syrup, boiling water and the pre-weighed jelly dries were blended and mixed for 5–6 minutes. Once the raw syrup reached 140° C. to 142° C., it was removed from the stove, and an appropriate amount was weighed and placed in a Hobart bowl and mixing started. The fat was then melted and mixed into the Hobart bowl, followed by the sifted jelly dries. The product was removed from the bowl onto release paper after about six minutes of mixing.

To perform the expansion, the product was placed, equally spaced, on trays in a vacuum expansion oven. The selection and operation of such ovens would be known to one of ordinary skill in the art. The trays were elevated above the heated shelves to help avoid uneven heating due to contact spots between the tray and shelf. The shelf immediately above each tray is used as a radiant heat source. The heat softened the product and caused the moisture to vaporize when vacuum wad applied and thus produced expansion. After expansion the heat helped to dry the product out. The oven was operated at about 80–83° C., with a chamber pressure of 22 to 24 Torr for a short period of time.

The total moisture content product made from recipe 1 before expansion was about 5.14 weight percent, and after expansion was about 1.6 weight percent. For products vacuum expanded from recipe 1, the average pore diameter on the surface was 0.25 mm and the average pore diameter in the center was 1.06 mm, yielding a ratio of about 1:4.3. For products vacuum expanded from recipe 2, the average pore diameter on the surface was 0.27 mm and the average pore diameter in the center was 1.58 mm, yielding a ratio of about 1:5.9. For products vacuum expanded from recipe 3, the average pore diameter on the surface was 0.30 mm and the average pore diameter in the center was 2.97 mm, yielding a ratio of about 1:10.

The resulting expanded product produced from recipe 1 had dimensions in the range of about 10 mm to 12 mm in length by about 15 mm to about 17 mm in diameter and a piece density on average of about 0.26 g/cm$^3$.

A nonsugar-based expanded product of this invention was prepared by first mixing a structure-enhancing amount of starch with water. The structure enhancing hydrocolloid was mixed with an effective amount of water to completely hydrate the starch. Complete hydration of the starch is believed to assist in reducing undesirable flavors, such as an uncooked flavor, that might result from using starch that is not completely hydrated. If desired, the structure-enhancing starch can be mixed with more water than is necessary for complete hydration followed by a step of reducing the water to a level that ensures that the moisture content of the nonsugar-based pre-expanded formulation is less than 10%. Once the structure-enhancing hydrocolloid and water mixture had been prepared as described above, a mixture of starch and cellulose was added as bulking agent to result in a nonsugar-based pre-expanded food formulation containing 55% by weight starch, 40 percent by weight cellulose and 5% water. It should be noted that the additional starch used as bulking agent may be hydrated either together with or separately from the structure-enhancing hydrocolloid so long as the water is reduced to a level that results in less than 10% moisture in pre-expanded food formulation. The nonsugar-based pre-expanded formulation prepared above was expanded substantially in accordance with the above-described examples, and a self-skinning product was produced.

COMPARATIVE EXAMPLES

The density characteristics of chemically aerated Maltesers® brand confections (available from Mars Inc., McLean, Va.) were compared with the density characteristics of self-skinning expanded products prepared from recipe 3 according to the present invention. The results are depicted graphically in FIG. 3.

Figure 3:
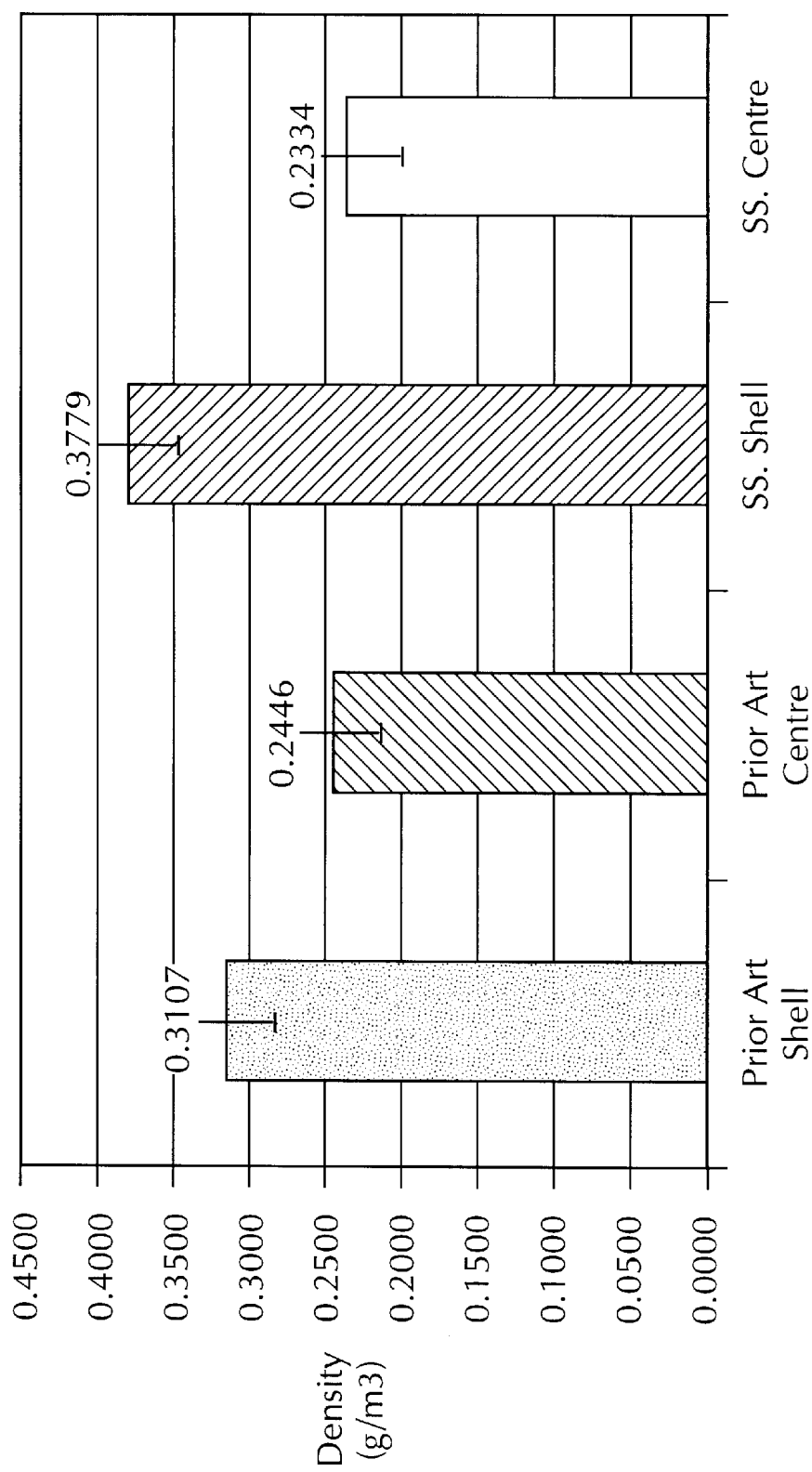
FIG. 3 is a graph showing the different densities of a surface portion and an inner portion of a chemically aerated expanded product versus an expanded product according to the invention.

To obtain the results shown in FIG. 3, the absolute density of surface portions of samples according to the prior art to a depth of 0.75 mm were measured. The results were plotted on the bar graph of FIG. 3. The absolute density of the center portions of the prior art samples were also measured and plotted. Similarly, the absolute density of surface portions of samples according to the invention to a depth of 0.75 mm were measured and plotted on the bar graph of FIG. 3. The absolute density of the center portions of the products according to the invention were also plotted on FIG. 3.

The difference in density between the open center portion and the surface portion is consistently and significantly larger in the expanded products according to the invention as compared with the prior art.

In FIG. 3, the depth of 0.75 mm was used as a demarcation line between center portion and surface portion. At this depth the self-sealing surface structure begins to be evident. In other instances, the depth of the surface portion may be smaller or larger.

In order to evaluate the structural integrity of the expanded products prepared according to the invention versus other expanded products, samples were provided as follows: a prior art toffee composition, vacuum expanded substantially as described above; Maltesers®, a chemically aerated composition with the coating removed therefrom; chemically aerated Whoppers® (available from Hershey Food Corporation, Hershey, Pa.) having the coating removed; Snack-ums®, an aerated cereal product (available from Kellogg USA, Battle Creek, Mich.) having the coating removed; and finally a self-sealing product prepared using Recipe 3 and expanded, substantially as described above.

Each of these products were placed in sixty four 6.75 inch×3.75 inch (17.25 cm×9.53 cm) bags in sixteen 12.813 inch×6.688 inch×3.688 inch (32.55 cm×16.99 cm×9.25 cm)

cartons placed in cardboard boxes measuring 15.625 inch×13.00 inch×6.875 inch (39.69 cm×33.02 cm×17.46 cm) and placed on a vibrating table and vibrated as described above. The attributes of the products and the dust percentage are reported in Table 2 below.

TABLE 2

| Product | Dust % | Total density (g/cc) | Outer Surface appearance | Coated/Uncoated |
|---|---|---|---|---|
| Vacuum expanded toffee recipe | 0.25 | 0.286 | course, dimpled open surface with some large holes | Uncoated |
| Maltesers (uncoated) ® | 0.17 | 0.260 | Smooth with some surface holes | Chocolate coating removed |
| Whoppers (uncoated) ® | 0.27 | 0.292 | Powdery surface | Chocolate coating removed |
| Snack-ums ® | 0.13 | 0.190 | Uneven with large surface holes | sugar/caramel coated |
| Self-Skinning foams | 0.03 | 0.201 | Smooth shiny with no surface holes | Uncoated |

As seen in the above results, the self-skinning samples according to the invention have better structural integrity as measured by dust percentage than the samples of the prior art. Products having the degree of dusting exhibited by the prior art would not be acceptable to consumers. Under actual shipment conditions, product would be subjected to even greater forces and over a longer period of time. Surface abrasion would be expected to continue and degrade the product even further.

Significantly, the self-sealing expanded products according to the invention exhibited better dusting characteristics than even the coated, starch-based Snack-ums® product.

The foregoing detailed description is exemplary only and is not intended to limit the scope of the invention, which is defined by the following claims.

What is claimed is:

1. An expanded food product prepared from a pre-expanded food formulation comprising (i) a structure-enhancing hydrocolloid, (ii) a bulking agent, and (iii) water, wherein at least one component of said pre-expanded food formulation is crystallizable, and wherein said expanded food product comprises a cellular inner portion containing pores formed by vaporization of at least a portion of said water and a substantially self-sealing surface portion having a greater density than said inner portion, wherein the expanded food product has a center density and a surface density and the ratio of said center density to said surface density ranges between about 1:1.25 to about 1:2.5.

2. The expanded food product of claim 1, wherein said pre-expanded food formulation further comprises a crystallizing agent.

3. The expanded food product of claim 2, wherein said crystallizing agent is selected from the group consisting of sugars, sugar alcohols, cellulose and mixtures thereof.

4. The expanded food product of claim 1, wherein the ratio of said center density to said surface density ranges between about 1:1.45 to about 1:2.0.

5. The expanded food product of claim 1, wherein the ratio of said center density to said surface density ranges between about 1:1.55 to about 1:1.75.

6. The expanded food product of claim 1, wherein said product is substantially free of byproducts of chemical aeration.

7. The expanded food product of claim 1, wherein total hydrocolloid is present in a range of about 0.25 weight percent to about 95 weight percent of the pre-expanded food formulation.

8. The expanded food product of claim 1, wherein said structure-enhancing hydrocolloid is a starch, gelatin, dextrin, or a mixture thereof.

9. The expanded food product of claim 8, wherein said structure-enhancing hydrocolloid is present in said pre-expanded food formulation in an amount between about 0.5 weight percent to about 5 weight percent.

10. The expanded food product of claim 1, wherein said expanded food product further comprises sugar in an amount between about 30 weight percent and about 95 weight percent.

11. The expanded food product of claim 1, wherein said pre-expanded food formulation has water activity between about 0.35 and about 0.65.

12. The expanded food product of claim 1, wherein said expanded food product has water activity between about 0.2 and about 0.3.

13. The expanded food product of claim 2, wherein said crystallizing agent comprises at least one sugar component having a particle size between about 5 microns and about 100 microns.

14. The expanded food product of claim 13, wherein said sugar component is present as a seeding agent in an amount between about 5 and about 20 weight percent with respect to the pre-expanded food formulation.

15. The expanded food product of claim 1, having a total density between about 0.15 g/cm$^3$ to about 0.50 g/cm$^3$.

16. The expanded food product of claim 1, having a dust percentage less than about 0.1 percent.

17. The expanded food product of claim 1, wherein at least a portion of at least one component in said expanded food product is in a crystalline state.

18. The expanded food product of claim 1, wherein a ratio of pore diameters in said surface portion to pore diameters in said cellular inner portion ranges between about 1:2.8 to about 1:16.0.

19. The expanded food product of claim 1, wherein a ratio of pore diameters in said surface portion to pore diameters in said cellular inner portion ranges between about 1:4.0 to about 1:9.5.

20. The expanded food product of claim 1, wherein said expanded food product is expanded at a temperature and a reduced pressure effective to vaporize at least a portion of said water.

21. An expanded food product prepared from a pre-expanded food formulation comprising a hydrocolloid and water, said expanded food product comprising a cellular inner portion containing pores formed by vaporization of at least a portion of said water and a substantially self-sealing surface portion having a greater density than said inner portion, said expanded food formulation having a dust percentage less than about 0.1 percent.

22. The expanded food product of claim 21, wherein said hydrocolloid is a starch, gelatin, dextrin, or a mixture thereof.

23. The expanded food product of claim 22, wherein said hydrocolloid is present in said pre-expanded food formulation in an amount between about 0.5 weight percent to about 5 weight percent.

24. The expanded food product of claim 21, wherein said pre-expanded food formulation has water activity between about 0.35 and about 0.65 and wherein said expanded food product has water activity between about 0.2 and about 0.3.

25. The expanded food product of claim 21, wherein a sugar having an average particle size between about 5 microns and about 100 microns is present as a seeding agent in an amount between about 5 and about 20 weight percent with respect to the pre-expanded food formulation.

26. A method of preparing an expanded food product having a cellular inner portion and a substantially self-sealing surface portion comprising the steps of:

(a) forming a pre-expanded food formulation comprising (i) structure-enhancing hydrocolloid present in an amount between about 0.25 weight percent to about 10 weight percent, (ii) water in amount effective to provide a water activity between about 0.35 to about 0.65 in said food formulation, (iii) a bulking agent, (iv) optionally sugar, (v) optionally fat, and (vi) optionally protein; and (b) vaporizing an effective amount of said water to form said expanded food product with a substantially self-sealing surface portion, wherein a ratio of a center density of said cellular inner portion to a surface density of said surface portion is in a range of about 1:1.25 to about 1:2.5.

27. The method of claim 26, wherein said step of forming a pre-expanded food formulation comprises:

(a) preparing a cooked syrup comprising at least one sugar and water; and (b) mixing said cooked syrup with a jelly composition comprising at least one hydrocolloid and water to form said pre-expanded food formulation.

28. The method of claim 27, wherein said step of mixing further comprises adding to said cooked syrup at least one sugar having an average particle size between about 5 microns and about 100 microns as a seeding agent.

29. The method of claim 26, wherein total hydrocolloid present in said pre-expanded food formulation is in a range of about 0.25 weight percent to about 95 weight percent.

30. An expanded food product prepared from a pre-expanded food formulation comprising (i) dextrin, gelatin and starch in an cumulative amount between about 0.9 percent by weight and about 1.0 percent by weight, (ii) sugar in an amount between about 60 and about 90.0 percent by weight, (iii) water in a range between about 5.0 and about 6.0 weight percent, (iv) fat in a range between about 6.0 and about 7.0 weight percent, wherein a portion of said sugar is in a crystalline state in said expanded food product which comprises a cellular inner portion containing pores formed by vaporization of at least a portion of said water and a substantially self-sealing surface portion having a greater density than said inner portion, wherein the expanded food product has a center density and a surface density and the ratio of said center density to said surface density ranges between about 1:1.25 to about 1:2.5.

* * * * *